Oct. 18, 1932.

A. C. KLECKNER

CASING FOR ELECTRICAL APPARATUS

Re. 18,627

Original Filed Aug. 26, 1926

2 Sheets-Sheet 1

Inventor.
Arthur C. Kleckner.
By Williams, Bradbury, McCaleb & Hinkle
Attorneys.

Oct. 18, 1932.

A. C. KLECKNER

CASING FOR ELECTRICAL APPARATUS

Re. 18,627

Original Filed Aug. 26, 1926

2 Sheets-Sheet 2

Inventor:
Arthur C. Kleckner
By Williams, Bradbury, McCaleb & Hinkle
Attorneys.

Reissued Oct. 18, 1932 Re. 18,627

UNITED STATES PATENT OFFICE

ARTHUR C. KLECKNER, OF RACINE, WISCONSIN, ASSIGNOR TO WEBSTER ELECTRIC COMPANY, OF RACINE, WISCONSIN

CASING FOR ELECTRICAL APPARATUS

Original No. 1,677,350, dated July 17, 1928, Serial No. 131,562, filed August 26, 1926. Application for reissue filed November 27, 1929. Serial No. 410,271.

My invention relates to casings for electrical apparatus, more particularly to casings for transformers used for ignition with automatic oil burners, but the invention is of general application to electrical apparatus and I do not limit its use to this type of transformer or transformers alone, but it will be found useful with any enclosed electrical apparatus where economy of manufacture or space, and convenient connection of conductors to external terminals without superimposing a junction box, upon the exterior of the casing, is desirable.

In the manufacture of the enclosed ignition transformer units for general use with automatic oil burners of various types of construction and operation with which these transformers are used, ordinarily the two primary or 110 volt lead wires are brought through a hole or insulating bushing in one side of the box, and as regulations usually require that these wires must be protected by the use of conduit, the designer has the alternative of providing wires long enough to extend to the nearest junction box, in which case it is impossible to meet the requirements of all junction box locations without excessive waste of wire; or of attaching the junction box to the outside surface of the transformer casing, in which case it is impossible to place the junction box or have the outlet in any one side and still adapt the unit to all the various types of oil burners with which they are used.

The object of my invention is the solution of the foregoing difficulties and the provision of a compact, economical, and serviceable enclosed transformer unit, by the provisions of a junction box built in the transformer casing itself with standard knock-outs in the transformer casing for the passage of leads.

Other objects of my invention will be understood most readily from the detailed description thereof taken in connection with the accompanying drawings in which.

Figure 1:
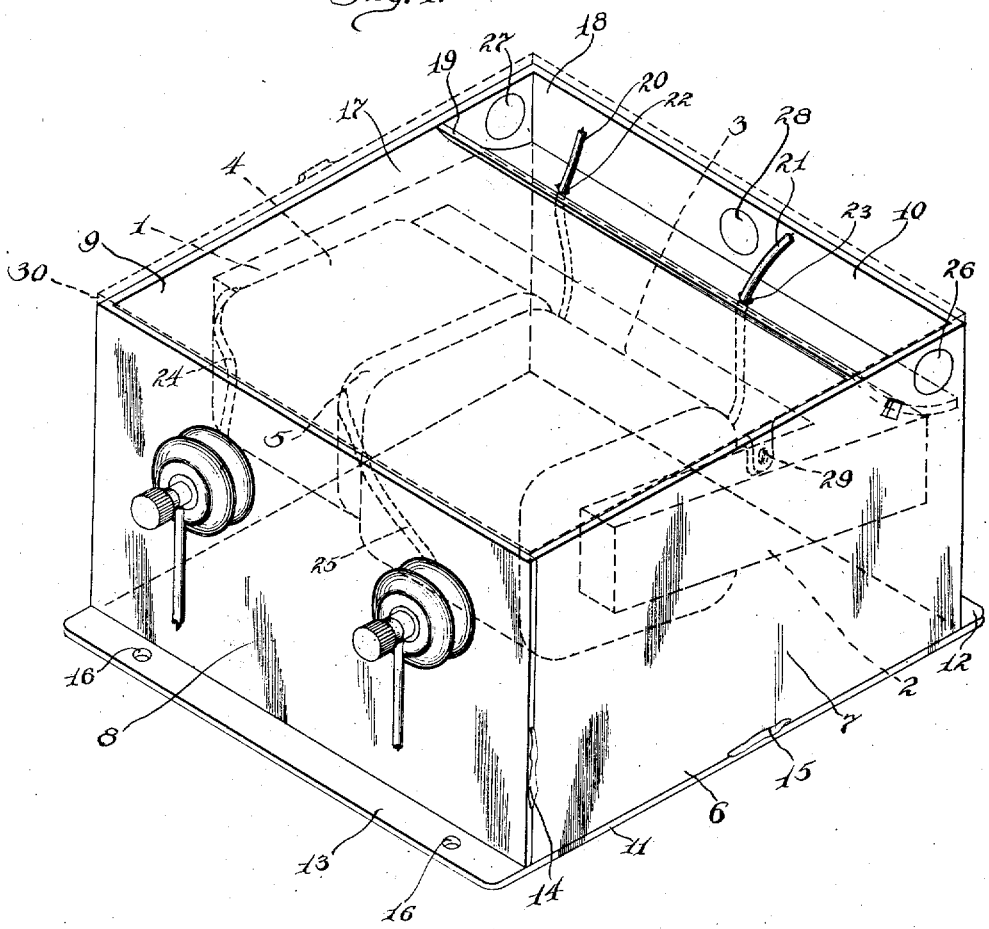
Fig. 1 is a view in perspective showing the complete assembly of the transformer, casing and built-in junction box.

Referring now to the drawings, in which like reference characters indicate the same parts in the several views; 1 indicates the electrical apparatus here shown as a standard ignition transformer for oil burners, consisting of the laminated core 2, upon a section of which are mounted the insulated primary coils 3 and the secondary coils 4, with the interposition of the usual layers of insulation 5, according to practice well known to those skilled in the art. The complete transformer 1 is enclosed in the casing 6, which may be constructed of cast or sheet metal or insulating material as desired but is here disclosed of sheet metal, the walls 7, 8, 9 and 10, the base 11 and the mounting brackets 12 and 13, being formed of one piece of sheet metal, as will be readily understood by those skilled in the art, the corners being bent to form the box casing and the whole held in fixed relation by any suitable fastening means, as by spot-welding at 14 and 15. The attaching brackets 12 and 13 are likewise bent up at the desired angle and are provided with suitable means for attachment, as holes 16 for screws.

The casing so constructed is divided into two compartments 17 and 18 by the rectangular partition 19, extending the full width of the casing 6 and cooperating with the walls 7, 9 and 10 to form the compartment or built-in junction box 18 of convenient dimensions for the enclosure of terminal connections soldered and wrapped with insulation in the conventional manner. The partition 19 may be curved or of one piece, forming two planes at right angles or a single plane surface as desired, but I prefer a curved partition as it gives a maximum of space in the junction box and interferes but little with the disposal of the transformer in the compartment 17. The partition 19 may be held in fixed relation to the walls 7, 9 and 10 by any convenient method as by spot-welding or by integral ears on the partition 19 extending into slots in the said walls, serving also to reenforce and brace the said casing. In the case of much larger electrical apparatus having a casing of greater length than is desired for a junction box, the partition 19 need not extend the full length of the wall 10 but only a part thereof and may be provided with an end closure, but my invention is of greatest importance in the small apparatus where space is limited.

The transformer 1 is placed in the compartment 17 of the casing 6 and the primary leads 20—21, of sufficient length only to form the usual connections, are passed through holes 22—23 in the partition 19 into the junction box 18, and the secondary leads 24—25 are passed through holes in the wall 8, provided with insulated bushings in the usual manner.

Figure 2:
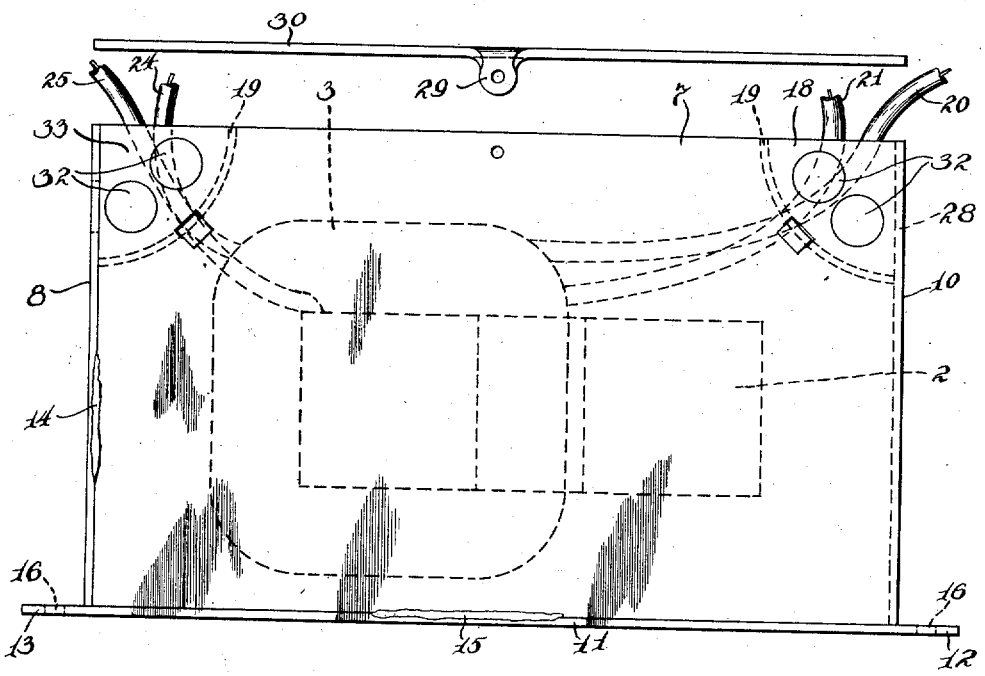
Fig. 2 is a side elevation of a modification of my invention showing the same assembly with a plurality of built-in junction boxes.

As the terminals 24—25 in this case are used to connect to the automatic oil burner apparatus to which the casing 6 is also attached, a junction box is not needed here and a short terminal is sufficient but in the modification shown in Fig. 2 I have illustrated an embodiment in which a junction box is provided for each of a plurality of terminals showing the arrangement of my invention where a plurality of junction boxes are desirable. The transformer having been placed in the casing, the space between the transformer, the casing walls 7, 8, 9 and 10 and the partition 19 is filled in with filler compound, preferably any plastic insulating, heat-conducting compound which hardens and holds apparatus and casing in fixed relation, but the junction box 18 is kept free of the compound to be used for the purpose described. In order to save space, the transformer 1 is disposed at a slight angle to the base 11, the laminations tilting downward under the junction box 18.

The walls 7, 9 and 10 are provided with standard knock-outs 26, 27, 28 located so as to give access to the junction box 18 from any one of three sides and to permit the insertion of flexible conduit or the attachment of solid conduit in the usual manner. The cover 30 encloses and completes the casing and junction box and may be attached by any convenient means as the ears 29, with screws.

In the modification of Fig. 2 I have illustrated an embodiment of my invention in which a plurality of built-in junction boxes are provided with a plurality of standard knock-outs on each side. Similar reference characters apply to the same parts, and the arrangement differs only in the provision of a like junction box 33 formed by walls 7, 8 and 9 and the cover 30. This modification is of particular importance where the electrical apparatus enclosed is not to be attached to other devices, and two junction boxes are required.

Figure 3:
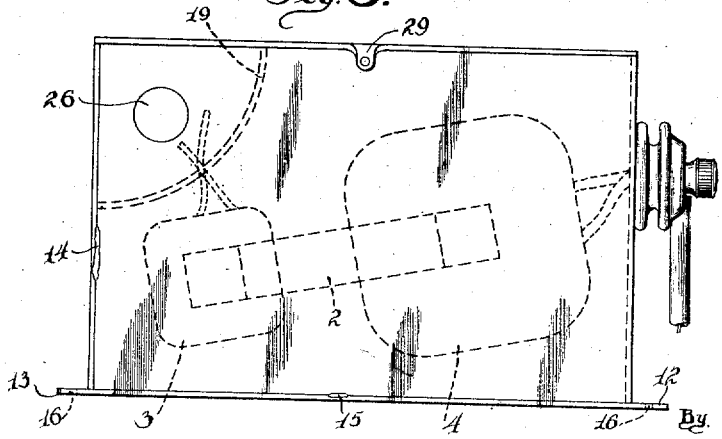
Fig. 3 is a side elevation of my invention showing an ignition transformer having a high ratio and consequently a secondary coil of much larger size than the primary coil.

In the embodiment shown in Figure 3, I have illustrated a transformer casing having a built-in junction box in combination with an ignition transformer, of very high ratio, with coils on separate legs and one coil of considerably larger size due to the high ratio of transformation desired in this apparatus. My invention is of particular importance in cases like the foregoing, where advantage may be taken of the utilization of waste space, to provide my built-in junction box.

While in the drawings and in the above description I have shown preferred embodiments and have limited my disclosure to certain definite details, it is to be understood that the invention is of general application to all types of electrical apparatus and should therefore be limited merely by the scope of the appended claims.

Having thus described my invention, what I claim is new and desire to secure by Letters Patent of the United States is:

1. In a casing for electrical apparatus, having certain plane sides at right angles, a main chamber for said apparatus having an open face and a secondary chamber in said casing for enclosing electrical connections, said secondary chamber being formed by a partition extending at right angles to certain opposite walls and diagonally from another wall to the plane of said open face, said secondary chamber having openings for the passage of electrical conductors through said partition and through an exterior wall of said secondary chamber.

2. In a casing for electrical apparatus, the combination of a primary chamber for said apparatus having a plurality of plane sides and an opening on one side with a partition extending across said casing between opposite walls thereof and also extending from a wall between said opposite walls to the plane of said opening, said partition forming a secondary chamber for enclosing electrical connections, said partition being provided with apertures for the passage of conductors, and the exterior walls of the said secondary chamber being provided with standard knock-outs and a cover for said casing for closing both of said chambers.

3. In a transformer unit, the combination of a casing having substantially rectangular walls with a transformer in said casing, a partition extending between two opposite walls and between two adjacent walls of said casing, said partition forming a secondary chamber for enclosing electrical connections, and being provided with apertures for conductors leading from said transformer, a plurality of standard knock-outs in the exterior walls of said secondary chamber, terminals from said transformer extending into said secondary chamber, and an initially plastic insulating compound about said transformer and securing the same in said casing, one of said adjacent sides comprising a cover for enclosing said casing and secondary chamber.

4. In a casing for electrical apparatus having certain plane sides at right angles, a main chamber for said apparatus having a removable wall and a secondary chamber in said casing for enclosing electrical connections, said secondary chamber being formed by a partition extending at right angles to certain opposite walls and across the corner from one wall to the plane of another wall, said secondary chamber being apertured for the passage of electrical conductors through said partition and through an exterior wall of said secondary chamber.

5. In an electrical device, the combination of a transformer with a casing having a primary chamber for enclosing said transformer, said casing having a partition cutting across a corner of said primary chamber to form a secondary chamber for a junction box, said casing having apertures to pass conductors from said transformer to said junction box and from said junction box to the exterior, and short leads carried by said transformer.

6. In a casing for electrical apparatus the combination of a sheet metal base of a substantially rectangular form with a side wall member having a plurality of plane sides forming a main chamber for the electrical apparatus, said side walls being secured to said base, an attaching flange supported by said base and projecting beyond one of said walls, and said casing being formed with a secondary chamber located within said casing for enclosing electrical connections, said secondary chamber being formed by a partition located inside the main chamber and extending from one wall to the adjacent wall which extends at right angles to the first mentioned wall.

7. In a casing for electrical apparatus the combination of a sheet metal base of a substantially rectangular form with a side wall member having a plurality of plane sides forming a main chamber for the electrical apparatus, said side walls being secured to said base, and said base projecting beyond opposite side walls to form attaching flanges, and said casing being formed with a secondary chamber located within said casing for enclosing electrical connections, said secondary chamber being formed by a partition located inside the main chamber and extending across the corner from one wall to the adjacent wall which extends at right angles to the first mentioned wall, said side wall being constructed of a piece of sheet metal having a plurality of right angle bends and having its ends joined together adjacent one of the corners of said casing.

8. In a casing for electrical apparatus the combination of a sheet metal base of a substantially rectangular form with a side wall member having a plurality of plane sides forming a main chamber for the electrical apparatus, said side walls being secured to said base, and said base projecting beyond opposite side walls to form attaching flanges, and said casing being formed with a secondary chamber located within said casing for enclosing electrical connections, said secondary chamber being formed by a partition located inside the main chamber and extending across the corner from one wall to the adjacent wall which extends at right angles to the first mentioned wall, said side wall being constructed of a piece of sheet metal having a plurality of right angle bends and having its ends joined together adjacent one of the corners of said casing, said secondary chamber having an opening through said partition and an opening through an exterior wall of said secondary chamber for the passage of electrical conductors.

9. In a casing for electrical apparatus the combination of a sheet metal base of a substantially rectangular form with a side wall member having a plurality of plane sides forming a main chamber for the electrical apparatus, said side walls being secured to said base, and said base projecting beyond opposite side walls to form attaching flanges, and said casing being formed with a secondary chamber located within said casing for enclosing electrical connections, said secondary chamber being formed by a partition located inside the main chamber and extending across the corner from one wall to the adjacent wall which extends at right angles to the first mentioned wall, said side wall being constructed of a piece of sheet metal having a plurality of right angle bends and having its ends joined together adjacent one of the corners of said casing, said secondary chamber having an opening through said partition and an opening through an exterior wall of said secondary chamber for the passage of electrical conductors, one of the walls of said main chamber being provided with openings for receiving insulators for high tension leads from the apparatus.

In witness whereof, I hereunto subscribe my name this 20th day of November, 1929.

ARTHUR C. KLECKNER.